United States Patent [19]
Lantz

[11] Patent Number: 5,113,981
[45] Date of Patent: May 19, 1992

[54] SAFETY LINE SHOCK ABSORBER

[76] Inventor: Michael D. Lantz, 3740 Bouquet Rd., Pacific, Mo. 63069

[21] Appl. No.: 423,384

[22] Filed: Oct. 19, 1989

[51] Int. Cl.$^5$ .............................................. F16F 7/12
[52] U.S. Cl. .................................... 188/371; 182/3; 267/74
[58] Field of Search ............... 188/371, 372, 376; 267/73, 74; 280/805; 182/3, 4; 297/471, 472; 24/442; 52/37

[56] References Cited

U.S. PATENT DOCUMENTS

| | | | |
|---|---|---|---|
| 3,444,957 | 5/1969 | Ervin | 182/3 |
| 3,561,819 | 2/1971 | Renneker | 188/371 X |
| 3,804,698 | 4/1974 | Kinloch | 182/3 X |
| 3,862,673 | 1/1975 | Benson | 280/805 X |
| 4,538,702 | 9/1985 | Wolner | 182/3 |
| 4,939,818 | 7/1990 | Hahn | 24/442 X |

Primary Examiner—Robert J. Oberleitner

[57] ABSTRACT

A safety line shock absorber that is designed to gradually break the fall and stop the user without the shock that occurs when the standard lanyard reaches full extension. The shock absorber incorporates the structure of a bungy cord in combination with an elongated strip of flat webbing that is folded longitudinally upon itself a plurality of times in an accordian type manner to form a plurality of lapped portions. A plurality of transverse rows of stitching across the respective lapped portions will tear apart and allow the webbing to be stretched out to its unfolded length when excessive force is applied to the longitudinal axis of the safety line shock absorber when a workman hooked up to the shock absorber unexpectedly takes a fall. The shock absorber has a cover strip that will tear anytime the stitched lapped portions of the webbing and the bungy cord has been used to gradually break a fall and reduce the shock of the last workman reaching the end of the line during a fall and ripping out the stitching of the webbing and the cover strip thus alerting the workman that it should be discarded and that it is no longer safe to use.

6 Claims, 2 Drawing Sheets

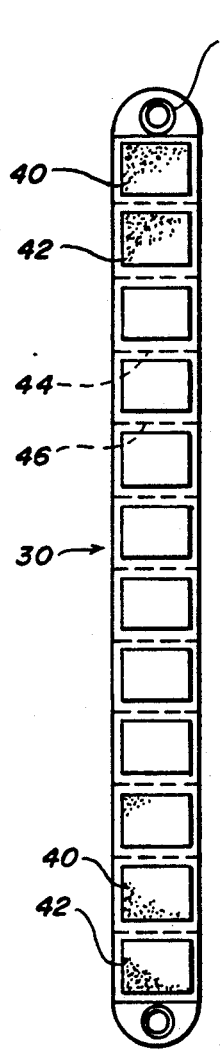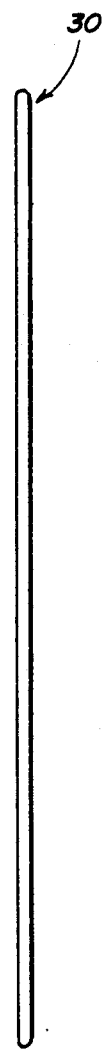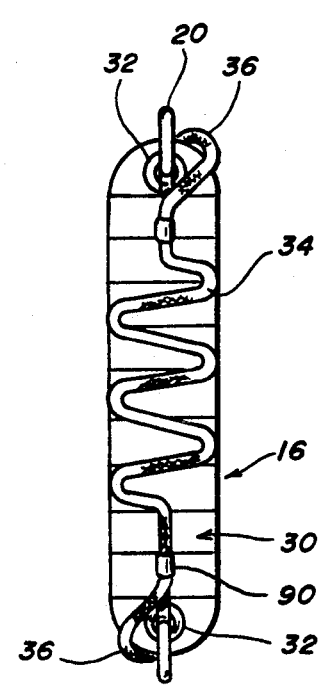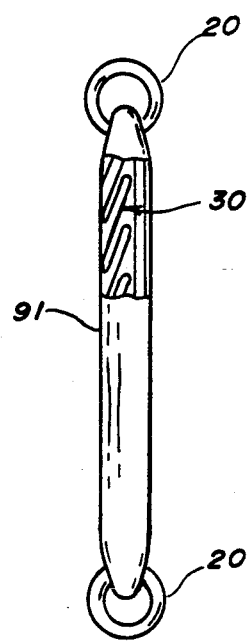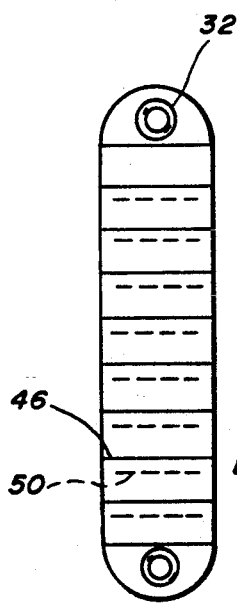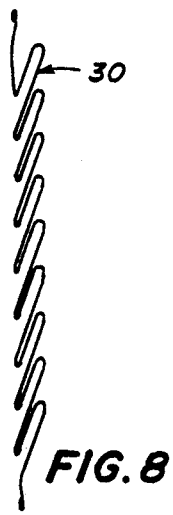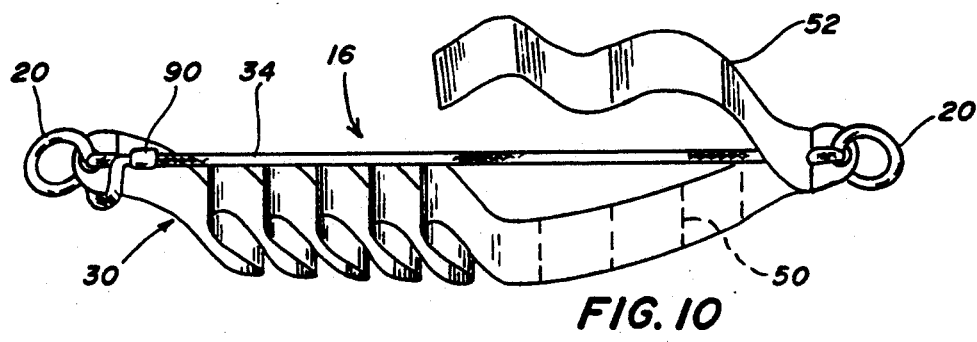

SAFETY LINE SHOCK ABSORBER

BACKGROUND OF THE INVENTION

The invention relates to shock absorbers, and more particularly to shock absorbers for safety belts and improvements therein.

Whenever a workman is positioned on a scaffold, catwalk or other high place where a fall could result in a serious injury, the workman will wear a harness such as a safety belt. The safety belt is attached to a short rope, a lanyard, which in turn, is connected to an anchoring or the like provided on the structure where the workman is located. To complete this safety belt assembly, a shock absorbing device is interconnected with the lanyard in such a manner as to prevent the lanyard from suddenly checking the fall of the workman. The shock absorber is an essential part of the safety belt assembly for when a lanyard suddenly checks the fall of a workman, the shock force against his body is severe and can be the cause of serious internal injury.

The maximum force about a man's waist, as when a safety belt is checking a fall, should be much less than 1000 pounds, and preferably not more than 600 pounds. However, to suddenly check the fall of a man by a conventional lanyard directly attached to a safety belt, the shock force which will occur may exceed 3000 pounds. If the lanyard is made of an elastic material such as a light weight nylon line, the shock force may be reduced, but the necessarily small diameter of the line and the resulting bounce are both undesirable. The shock absorber, whether in tandem with the lanyard or whether shunting a slack portion of the lanyard, should function whenever a pull upon it exceeds a selected value such as 600 pounds. It should extend itself or stretch, and continue to stretch until the fall is completely checked.

It is an object of the invention to provide a novel safety line shock absorber having an improved structure over those shock absorbers presently available in the market place.

It is also an object of the invention to provide a novel safety line shock absorber that is economical to manufacture and market.

It is another object of the invention to provide a novel safety line shock absorber that utilizes a bungy cord and a nylon strap that work in tandem to gradually bring a person falling to a stop.

It is a further object of the invention to provide a novel safety line shock absorber having structure that will clearly indicate if it has been previously been used so that it may be discarded and not put into service.

SUMMARY OF THE INVENTION

Applicant's novel safety line shock absorber has been designed to gradually break the fall of the workman attached thereto and to stop the user without the shock that occurs when a standard lanyard reaches full extension.

The novel safety line shock absorber is actually two different lines, the multi-strand bungy cord and an especially designed nylon strap, working in tandem to slow the fall. Normally the safety line shock absorber structure is folded into a plastic box casing which houses the bungy cord and the folded nylon strap. A nylon strap is stitched at the top of each fold, and the weight of the workman falling breaks each stitch. Also there are alternating zones on the top surface of the strip of flat webbing to which are secured hook fastener structure and loop fastener strips. These respective sets of alternating zones are folded against each other when the elongated strip of webbing is folded upon itself in an accordian type manner to form the plurality of lapped portions.

As the nylon strap feeds out, the stitches in one consecutive lapped portion after another are torn and the hook and loop fastener structure is also pulled apart. Further reducing the speed of the workman's fall is the bungy cord as it begins to stretch. A safety line shock absorber is designed so that the bungy cord has enough tension to support the falling workman just as the nylon strap is reaching full extension. Preventing that snap when the line reaches full extension means preventing possible injuries to the falling workman. Applicant's innovative safety system is light weight, reliable and most importantly, safe to use.

DESCRIPTION OF THE DRAWINGS

FIG. 3 is a top plan view of the elongated strip of flat webbing prior to it's being folded longitudinally upon itself a plurality of times in an accordian type manner to form a plurality of lapped portions;

FIG. 4 is a side elevation view of the elongated strip of flat webbing seen in FIG. 3;

FIG. 5 is a schematic top plan view illustrating the manner in which the bungy cord is laid out in a serpentine fashion on the top surface of the strip of flat webbing;

FIG. 6 is a schematic side elevation view of the safety line shock absorber with the casing broken away;

FIG. 7 is a top plan view of the safety line shock absorber showing the strip of flat webbing formed into a plurality of lapped portions;

FIG. 8 is a side elevation view of the structure illustrated in FIG. 7;

FIG. 10 is a perspective view illustrating the safety line shock absorber with the cover broken away to show how it appears shortly after the shock absorber begins to perform its function.

DESCRIPTION OF THE PREFERRED EMBODIMENT

Applicant's novel safety line shock absorber will now be described by referring to FIGS. 2-10 of the drawings. The safety line shock absorber is generally designated numeral 16.

Figure 1:
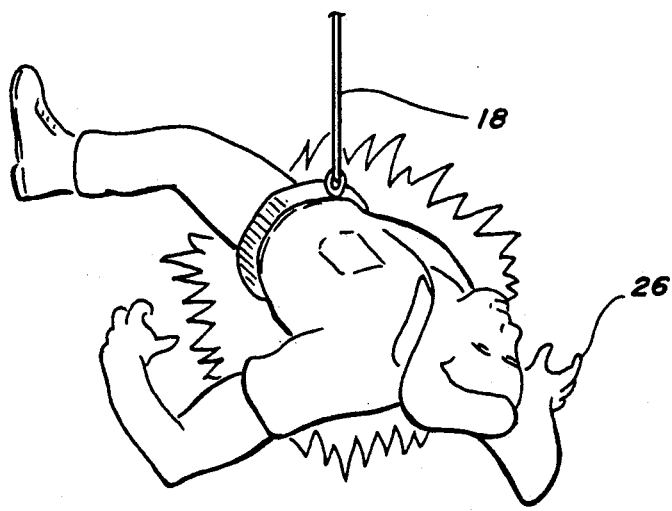
FIG. 1 is a perspective view illustrating the shock that takes place on a workman's back when a standard lanyard is connected to his safety belt.
Figure 2:
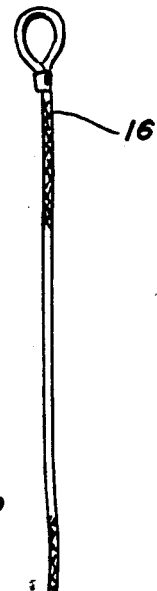
FIG. 2 is a front elevation view of applicant's novel safety line shock absorber attached to the bottom end of a lanyard and showing the cover strip in place over the webbing and the bungy cord.

In FIG. 2, the top end of shock absorber 16 is illustrated as being attached to a lanyard 18 having an eye 19 formed on its bottom end. A ring 20 passes through eye 19. A snap hook 22 is attached to the bottom end of shock absorber 16 and it in turn is connected to a safety belt 24 worn by a worker 26. FIG. 6 shows a casing 91 covering the shock absorber 16.

Figure 9:
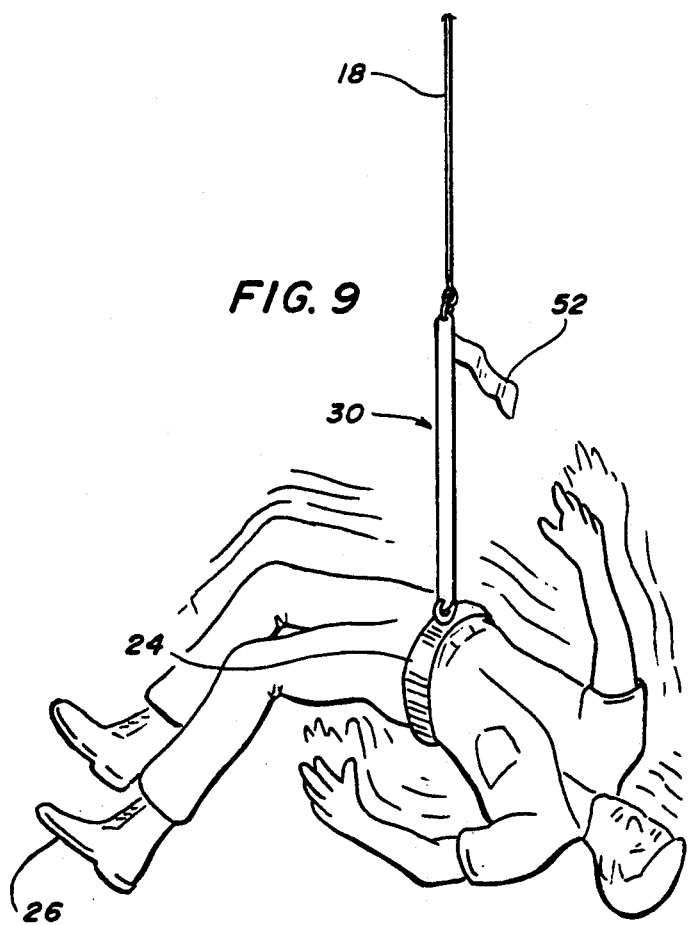
FIG. 9 is a perspective view illustrating the manner in which applicant's novel safety line shock absorber brings the workman to a safe stop.

Referring to FIGS. 3-8, the specific structure of the safety line shock absorber 16 is illustrated in detail. An elongated strip of flat nylon webbing 30 has a pair of grommets 32 secured in each of its ends. A bungy cord 34 has loops 36 formed in its opposite ends that pass through the eyes formed by grommets 32. The loops 36 are held in place by collar 90. Alternate zones 40 and 42 are formed along the top surface of webbing 30. Zones 40 have hook fastener structure secured therto and zones 42 have loop fastener structure secured thereto. This structure is better known under the trademark, VELCRO. When the webbing is lapped upon its self about bottom fold lines 44, the hook and loop zones are brought into engagement. The top fold lines 46 identify the top of the lapped webbed portions and transverse rows of stitching 50 also secure the lapped portions together. A cover 52 made of a strip of plastic covers the folded lapped portions. FIGS. 7 and 8 show the webbing folded longitudinally upon itself a plurality of times in an accordian type manner to form a plurality of lapped portions. In FIG. 10, the shock absorber is shown after the cover 52 has been ripped and some of the rows of stitching 50 have been torn. The culmination of the shock absorbing process by the shock absorber 16 is illustrated in FIG. 9.

What is claimed is:

1. A safety line shock absorber comprising:
    an elongated strip of flat webbing having a predetermined length and width, said strip having a top surface, a bottom surface, a left end and a right end, said strip of webbing being folded longitudinally upon itself a plurality of times in an accordian type manner to form a plurality of lapped portions;
    an elongated bungy cord having a predetermined length, said bungy cord having a left end and a right end;
    means for securing the left end of said bungy cord to the left end of said elongated strip of flat webbing;
    means for securing the right end of said bungy cord to the right end of said elongated strip of flat webbing; and
    a plurality of transverse rows of stitching across said respective lapped portions that will tear apart and allow said webbing to be stretched out to its unfolded length when excessive force is applied to the longitudinal ends of the safety line shock absorber when a workman hooked up to said shock absorber unexpectedly takes a fall.

2. A safety line shock absorber as recited in claim 1 wherein the unstretched length of said bungy cord is less than the length of said elongated strip of webbing in its unfolded state.

3. A safety line shock absorber as recited in claim 1 wherein said left end of said elongated strip of webbing is connected to one end of a conventional lanyard.

4. A safety line shock absorber as recited in claim 1 further comprising a cover strip having a length approximating the length of said strip of flat webbing in the flat webbing's folded state whereby the cover will tear anytime the stitched lapped portions of the webbing and the bungy cord have been used to gradually break a fall and reduce the shock of the last workman reaching the end of the line during a fall and ripping out the stitching of the webbing and the cover strip thus alerting the workman that the flat webbing and bungy cord should be discarded and that the flat webbing and bungy cord are no longer safe to use.

5. A safety line shock absorber as recited in claim 1 wherein there are alternating zones on the top surface of said strip of flat webbing to which are secured hook fastener strips and loop fastener strips, these respective sets of alternating zones are folded against each other when the elongated strip of webbing is folded upon itself in an accordian type manner to form a plurality of lapped portions.

6. A safety line shock absorber comprising:
    an elongated strip of flat webbing having a predetermined length and width, said strip having a top surface, a bottom surface, a left end and a right end, said strip of webbing being folded longitudinally upon itself a plurality of times in an accordion type manner to form a plurality of lapped portions;
    wherein said left end of said elongated strip of webbing is connected to one end of a conventional lanyard;
    a plurality of alternating zones on the top surfaces of said strip of flat webbing to which are secured hook fastener strips and loop fastener strips, these respective sets of alternating zones are folded against each other when the elongated strip of webbing is folded upon itself in an accordion type manner to form a plurality of lapped portions;
    an elongated bungy cord having a predetermined length, said bungy cord having a left end and a right end;
    wherein the unstretched length of said bungy cord is less than the length of said elongated strip of webbing in its unfolded state;
    means for securing the left end of said bungy cord to the left end of said elongated strip of flat webbing;
    means for securing the right end of said bungy cord to the right end of said elongated strip of flat webbing;
    a plurality of transverse rows of stitching across said respective lapped portions that will tear apart and allow said webbing to be stretched out to its unfolded length when excessive force is applied to the longitudinal end of the safety line shock absorber when a workman hooked up to said shock absorber unexpectedly takes a fall; and
    a cover strip having a length approximating the length of said strip of flat webbing in the flat webbing's folded state whereby the cover will tear anytime the stitched lapped portions of the webbing and the bungy cord have been used to gradually break a fall and reduce the shock of the last workman reaching the end of the line during a fall and ripping out the stitching of the webbing and the cover strip thus alerting the workman that the flat webbing and bungy cord should be discarded and that the flat webbing and bungy cord are no longer safe to use.

* * * * *